(12) United States Patent
Kimura (10) Patent No.: US 6,462,649 B1
(45) Date of Patent: Oct. 8, 2002

(54) AIR BAG FAILURE DISPLAY SYSTEM AND METHOD

(75) Inventor: Makoto Kimura, Kanagawa-ken (JP)

(73) Assignee: Nissan Motor Co., Kanagawa (JP)

( * ) Notice: Subject to any disclaimer, the term of this patent is extended or adjusted under 35 U.S.C. 154(b) by 0 days.

(21) Appl. No.: 09/489,934

(22) Filed: Jan. 24, 2000

(30) Foreign Application Priority Data

Jan. 26, 1999 (JP) .......................................... 11-017596

(51) Int. Cl.[7] ................................................ B60Q 1/00
(52) U.S. Cl. .................... 340/435; 340/425.5; 340/438; 701/45; 701/46; 701/47
(58) Field of Search .............................. 340/425.5, 435, 340/436, 438, 430; 701/45, 46, 47; 280/734, 735

(56) References Cited

U.S. PATENT DOCUMENTS

| | | | |
|---|---|---|---|
| 4,359,715 A | * 11/1982 | Langer et al. | 340/436 |
| 4,999,775 A | * 3/1991 | Muraoka | 340/436 |
| 5,422,965 A | * 6/1995 | Bekki et al. | 340/436 |
| 5,482,314 A | * 1/1996 | Corrado et al. | 280/735 |
| 5,521,822 A | * 5/1996 | Wang | 340/669 |
| 5,605,348 A | * 2/1997 | Blackburn | 280/735 |
| 5,748,477 A | * 5/1998 | Katoh | 340/436 |
| 5,918,899 A | * 7/1999 | Watanabe | 340/438 |

* cited by examiner

*Primary Examiner*—Jeffery Hofsass
*Assistant Examiner*—Daniel Prévl
(74) *Attorney, Agent, or Firm*—McDermott, Will & Emery (57) ABSTRACT

An action counter (27) counts the number of turn-on actions by an operator to an ignition switch (3) over a prescribed period of time, and a deceleration sensor (9) senses a deceleration imparted to the vehicle within a prescribed period of time. After the counted number of turn-on actions has exceeded a prescribed count value, if the deceleration exceeds a prescribed value, a switching intent determiner (5) makes a judgment of the operator's intent to switch the display mode of an air bag failure display device (17) from a normal mode to a maintenance mode.

9 Claims, 5 Drawing Sheets

AIR BAG FAILURE DISPLAY SYSTEM AND METHOD

BACKGROUND OF THE INVENTION

The present invention relates to an air bag failure display system and an air bag failure display method that displays a result of a failure diagnosis of an air bag system of a vehicle in a mode selected among a plurality of display modes different of information content, for example from between a normal mode for display to user and an intelligent mode for display to maintenance personnel.

A conventional air bag failure display system indicates a result of a failure diagnosis of an air bag system of a vehicle in a display mode selective between a normal mode and a maintenance mode.

In the normal mode, a driver of the vehicle is simply notified of an occurrence of a failure of the air bag system. If the air bag system is free of problem, this display takes the form of a display lamp which lights for seven seconds and then is extinguished. In the case the failure diagnosis revealed a problem, the display is flashed with a prescribed period, regardless of the type and location of the failure, to prompt the driver to visit a service location.

The maintenance mode is provided to notify maintenance personnel of details of the normal or failed condition of the air bag system. This display takes the form of a display lamp flashing to provide coded information like Morse code, which informs the maintenance personnel not only that a failure has occurred, but also its location and type.

In the conventional air bag failure display system, after an ignition switch of the vehicle is set to an on state from its off state, if a door opening/closing switch is operated five times within seven seconds, the normal mode is switched to the maintenance mode.

SUMMARY OF THE INVENTION

In the conventional air bag failure display system, however, because the switching from the normal mode to the maintenance mode is done in response to operation of the door switch, there is a need not only to make connection between the air bag system and the door switch, which had previously been unrelated to the air bag system, but also to provide a new wiring harness and interface circuit between the air bag system and the door switch. This causes an increase in the number of parts and an increase in the manufacturing cost.

The present invention is made with such points in view. It therefore is an object of the present invention to provide a simple air bag failure display system that reliably selects an intended display mode. It also is an object of the present invention to provide a facilitated air bag failure display method that reliably selects an intended display mode.

An aspect of the invention devised to solve the above-noted problem is an air bag failure display system that displays a result of a failure diagnosis of an air bag system of a vehicle in a selective one of a plurality of display modes, the air bag system including an air bag controller having an apparatus employed therefor. This display system has an operation sensor which senses a prescribed operation performed to the apparatus, a deceleration sensor which senses a deceleration imparted to the vehicle, and a display mode selector which, after the prescribed operation has been sensed by the operation sensor, switches a current display mode to another display mode if the deceleration sensed by the deceleration sensor exceeds a prescribed value.

According to this aspect of the present invention, an operation sensor senses a prescribed operation performed by an operator to an apparatus employed for an air bag controller of an air bag system of a vehicle, and a deceleration sensor senses a deceleration imparted to the vehicle, and a display mode selector switches a current display mode to another display mode if the deceleration sensed by the deceleration sensor exceeds a prescribed value after the prescribed operation has been sensed by the operation sensor. This provides reliable attainment of a display mode desired by the operator without the need for an increase in the number of components, thereby reducing the manufacturing cost.

Another aspect of the invention is an air bag failure display system for a vehicle having a set of sensing elements arranged therein to sense a state of the vehicle, and an air bag system including an air bag, an air bag control system that receives signals from the set of sensing elements and controls the air bag in response to the received signals, and an air bag failure diagnosis system that performs a failure diagnosis of the air bag system. This display system comprises the set of sensing elements employed to sense variations of the state of the vehicle incurred by a combination of operator actions given to the vehicle as an operator command, a signal processor which processes the received signals to decode the operator command, and a display device which indicates a result of the failure diagnosis in a display mode selected from a plurality of display modes different of information content in dependence on the operator command decoded by the signal processor.

According to this aspect of the invention, an air bag failure display system is provided for a vehicle in which an air bag system includes an air bag control system and an air bag failure diagnosis system that performs a failure diagnosis of the air bag system. In this arrangement, (an) operator (s) gives (or give) a voluntary coded command in the form of a combination of intended actions (e.g. switching actions and braking) by the operator(s) to the vehicle. The vehicle thus has corresponding variations (e.g. current conduction and vehicle deceleration) incurred in a vehicular state, which are sensed by a set of sensing elements arranged in the vehicle for the air bag control system so that corresponding signals therefrom are received by the air bag control system. Then, the received signals are processed by a signal processor of the air bag failure display system to decode the operator command, and a display device indicates a result of the failure diagnosis in a display mode selected from a plurality of display modes different of information content in dependence on the decoded operator command.

Accordingly, the operator command is indirectly interfaced to the air bag failure display system via associated portions of the vehicle and the air bag control system, without the need to provide a direct interface therebetween.

Another aspect of the invention is an air bag failure display method for a vehicle having a set of sensing elements arranged therein to sense a state of the vehicle, and an air bag system including an air bag, an air bag control system that receives signals from the set of sensing elements and controls the air bag in response to the received signals, and an air bag failure diagnosis system that performs a failure diagnosis of the air bag system. This display method comprises employing the set of sensing elements to sense variations of the state of the vehicle incurred by a combination of operator actions given to the vehicle as an operator command, processing the received signals to decode the operator command, and indicating a result of the failure diagnosis in a display mode selected from a plurality of display modes different of information content in dependence on the operator command decoded by the processing.

According to this aspect also, there can be achieved like effects to the previous aspect of the invention.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Details of the preferred embodiments of the present invention are presented below, with reference to the accompanying drawings, in which corresponding elements are assigned the same reference characters.

Figure 1:
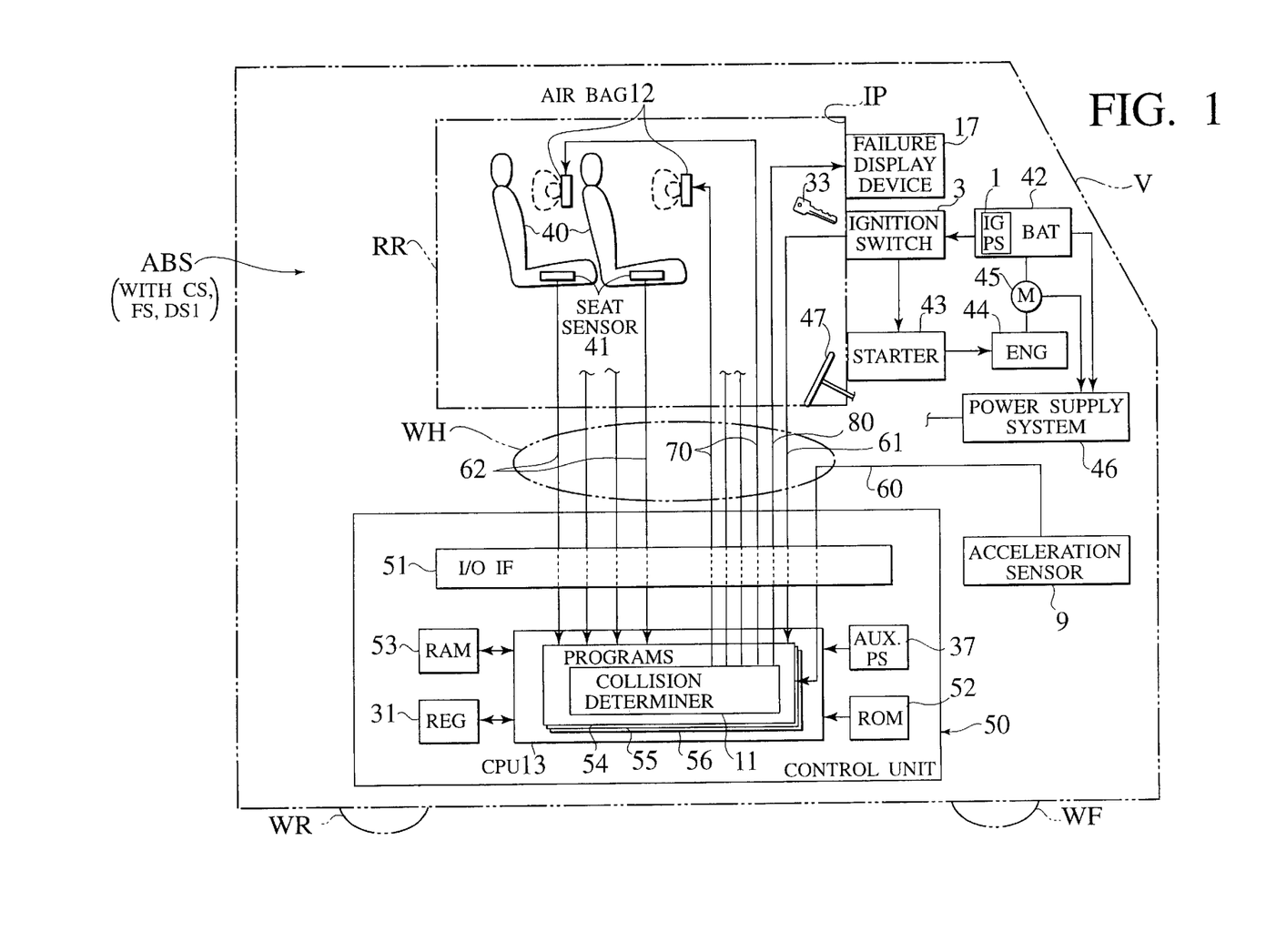
FIG. 1 is a schematic diagram illustrating a vehicle equipped with an air bag system including an air bag control system, an air bag failure diagnosis system, and an air bag failure display system according to an embodiment of the present invention.

FIG. 1 illustrates a vehicle V equipped with an air bag system ABS.

The vehicle V has a rider room RR, where front and rear seats 40 are installed to be occupied by a driver and occupants (sometimes collectively referred to as "riders"). Each seat 40 is provided with one or more air bags 12, such as a chest and head protecting air bag and a lateral-collision air bag. The vehicle V can ran with drive torque from an engine E to front wheels WF and/or rear wheels WR, with speeds accelerated by an accelerator pedal or decelerated by a brake pedal 47, stop when necessary, and provide services to the riders, and can partially or wholly have various stationary, mobile, accelerated, decelerated, loaded, energized, heated, cooled, electromagnetic, optical, acoustic and/or manually operated or automatically controlled states (hereafter sometimes collectively called "situations"), which are sensed as necessary by varieties of situation sensing elements arranged in (or on) the vehicle V.

The air bag system ABS comprises a total number of air bags 12 in the vehicle V, and three subsystems for their control: an air bag control system CS, an air bag failure diagnosis system FS, and an air bag failure display system DS1 according to a first embodiment of the present invention. The subsystems have system components common therebetween and/or with part of hardware or software of the vehicle V, as will be detailed.

The air bag control system CS serves as an air bag controller for protecting the safety of riders when the vehicle V is subjected to a collision, and controls deployment of respective air bags 12, individually or by control branches. The control system CS comprises a packaged control unit 50 having an air bag control program 54 read in a CPU (central processing unit) 13 thereof, a set of situation sensing elements associated therewith (including an ignition switch 3, a respective acceleration sensor 9, and a respective seat sensor 41), and a wiring harness WH for electrically and/or optically interconnecting the control unit 50 with the sensing elements and the air bags 12, as well as with associated devices including a failure display device 17.

The control unit 50 comprises a microcomputer including the CPU 13, an I/O (input-output) interface 51 therefor, and peripherals such as a ROM (read-only memory) 52, a RAM (random access memory) 53 and a G (acceleration gravity) data register 31, and is provided with an internal auxiliary power supply 37 composed of a capacitor relatively large in capacity. The CPU 13 reads from the ROM 52 and executes various programs, for example: the air bag control program 54 for individually controlling the air bags 12 by using a collision determiner 11 it contains; an air bag failure diagnosis program 55 for diagnosing the air bag system ABS for probable failures; and an air bag failure display control program 56 for displaying results of diagnoses of the air bag failure diagnosis program 55, in a selective one of a plurality of display modes different of information content or intelligence, including a normal mode for display to user and a maintenance mode for display to maintenance personnel, on the failure display device 17 provided on an instrument panel IP in the rider room RR.

The set of situation sensing elements provided for the control system CS comprises: longitudinal and transverse acceleration sensors (collectively designated by reference numeral 9) including an acceleration sensor 9 located at a front end of the vehicle V for sensing in gravity unit (G) a positive acceleration imparted to the vehicle, such as by a foot-in action to an accelerator pedal or due to a rear-end collision or frontwardly oblique collision, and a negative acceleration (i.e. decceleration) imparted thereto, such as by a foot-in action to a brake pedal 47 or due to a front-end collision or rearwardly oblique collision; a plurality of seat sensors 41 as rider sensing elements each respectively disposed in or near an associated seat 40 for electrically or optically sensing whether a rider (or maintenance personnel) is seated in the seat 40 or not; and an ignition switch 3 for electrically signalising ignition switch turn-on and turn-off actions of the driver (or maintenance personnel) by an engine ignition key 33. Upon turn-on action, electric power is supplied from an ignition power supply 1 as part of a vehicle-mounted battery 42 to an engine starter 43 and associated ignition elements, to start an engine 44 of the vehicle V, thereby rotating a motor 45 to generate electric power, feeding the battery 42 with restoring power, and transmitting drive torque to the front and/or rear road wheels WF and WR if an associated clutch (or clutches) is (are) engaged. Direct-current power from the battery 42 as well as alternating-current power from the motor 45 is supplied as necessary via a power supply system 46 to electrical appliances and electronics within the vehicle V, covering the control unit 50 and the set of situation sensing elements.

The wiring harness WH comprises a multiplicity of electrical and/or optical lines and/or cables including: a signal line 60 connected between a respective acceleration sensor 9 and a corresponding input terminal of the control unit 50 for transmitting an acceleration signal to be sent therebetween to be input via the I/O interface 51 to the CPU 13, where it is read by the air bag control program 54, where it is processed to be held as a corresponding G data in the register 31, to be processed by the collision determiner 11 as necessary; a signal line 61 connected between the ignition switch 3 and an input terminal of the control unit 50 for transmitting a switch operation representative voltage signal to be input to the CPU 13, where it is read by the control program 54, where it is processed to be stored as a combination of corresponding flag and count data in the RAM 51, to be read by the CPU 13 as necessary; a number of signal lines 62 each respectively connected between a corresponding seat sensor 41 and an input terminal of the control unit 50 for transmitting a rider's sitting action representative signal to be input to the CPU 13, where it is read by the control program 54, whereby it is stored as a combination of corresponding flag and count data in the RAM 51, to be read in the CPU 13 as necessary; a number of command lines 70 each respectively connected between a corresponding output terminal of the control unit 50 and a drive circuit of a corresponding air bag 12 for transmitting therebetween an air-bag controlling command output by a control action of the collision determiner 11 along with its decision based on read data on signals from associated situation sensing elements; and a command line 80 connected between an output terminal of the control unit 50 and a drive circuit of the failure display device 17 for transmitting therebetween a display controlling command output from the CPU 13 by the air bag failure display control program 56 cooperating with the air bag failure diagnosis program 55 and/or a storage region of the RAM 53 storing output data from the program 55.

The air bag failure diagnosis system FS comprises the set of situation sensing elements employed together with the wiring harness WH to sample diagnostic data, and the control unit 50 having the air bag failure diagnosis program 55 read in the CPU 13.

The air bag failure display system DS1 comprises the set of situation sensing elements employed therefor to sense variations incurred in associated situations of the vehicle V by a combination of operator actions given to the vehicle V as a coded operator command, the wiring harness WH employed to transmit necessary signals and associated commands, and the control unit 50 as a signal processor having the air bag failure display control program 56 read in the CPU 13 together with an entirety or necessary components of the air bag control program 54, and the failure display device 17. The control unit 50 is then adapted to work for processing input signals from the set of situation sensing elements, comparing resultant data with given judgment criteria to decode the operator command, thereby determining an operator's intent to switch the display mode. As a result, there is selected an intended display mode, and a corresponding display command carrying an associated display data is transmitted to the failure display device 17, where it is rendered to indicate an associated diagnostic result in accordance with the display data so that the diagnostic result is displayed in the selected display mode.

Figure 2:
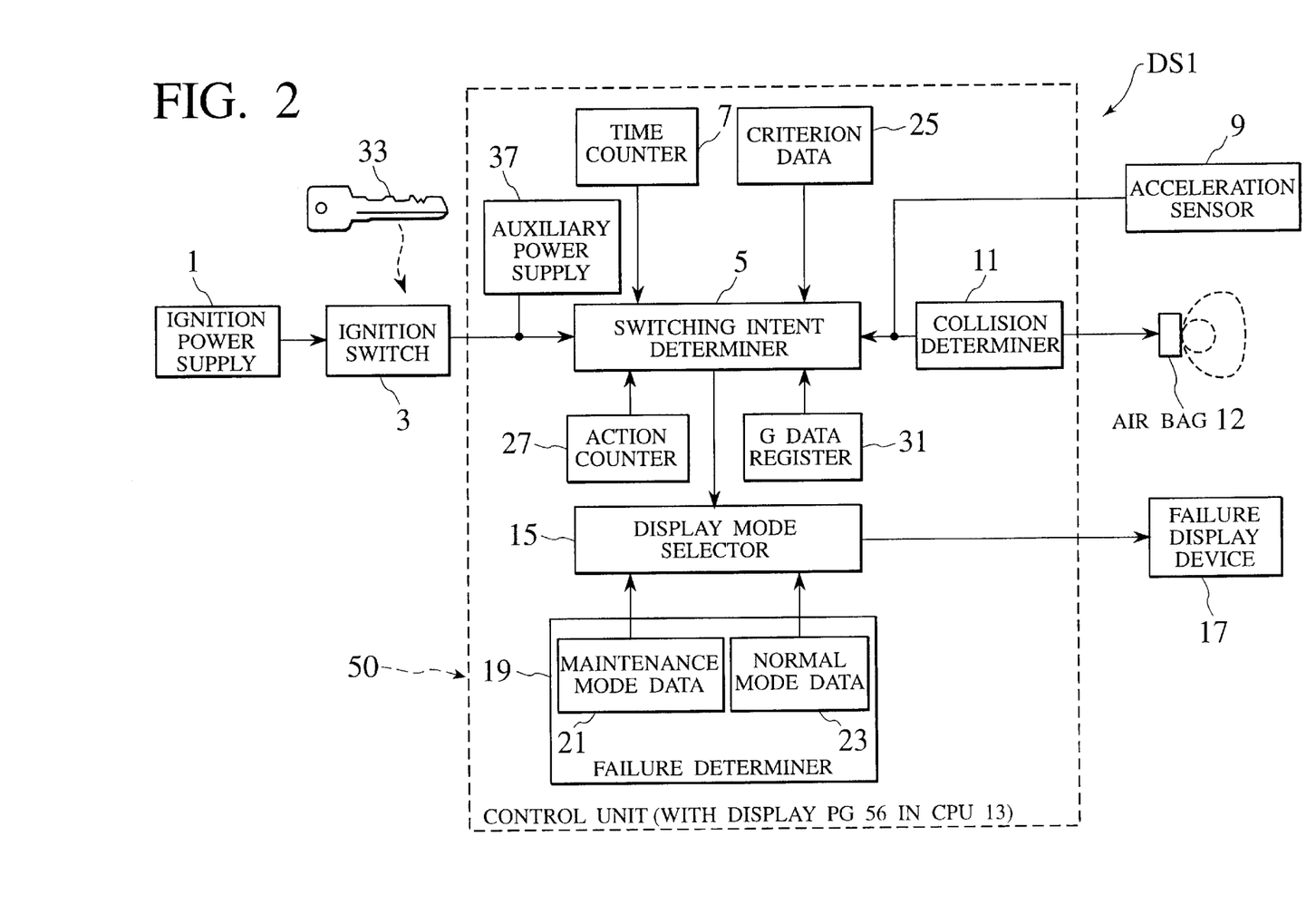
FIG. 2 is a functional block diagram of the air bag failure display system.

FIG. 2 shows the air bag failure display system DS1 as a functional block diagram, where the display system DS1 comprises the ignition switch 3 as a situation sensing element connected to the ignition power supply 1 and configured for operation by the ignition key 33, the acceleration sensor 9 as another situation sensing element, the failure display device 17, and the control unit 50 connected via the wiring harness WH (FIG. 1) to the sensing elements 3 and 9 and the display device 17 as well as to each air bag 12.

The ignition power supply 1 is a 12-volt battery used to operate the engine E and some electronics in the vehicle V including the control unit 50. Electrical power from this power supply 1 is supplied to those electronics when the ignition switch 3 is set to on. The ignition switch 3 can be set to on and off by operating the ignition key 33 inserted in a key cylinder.

The air bag failure display control program 56 has a display mode selector 15 and a switching intent determiner 5 linked therewith. The display mode selector 15 is driven by a select command from the switching intent determiner 5, for switching a current display mode to a subsequent display mode to be selected in accordance wit the select command. The switching intent determiner 5 makes a determination as to whether an operator wishes to switch the current display mode to the subsequent display mode, and responds to a result of the determination by outputting the select command to the display mode selector 15. For the determination, the intent determiner 5 is responsible for interpretation of an intent exhibited by the operator to the vehicle V, in the form of sequential actions thereto that constitute a coded command for a desired display mode selection.

In this embodiment, the coded command appears as a combination of a number of turn-on actions to the ignition switch 3 followed by a foot-in action to the brake pedal 47. To decode the coded command, the control program 56 employs and processes an action count data from an action counter 27 it has, a time count data from a waiting time counter 7 in the CPU 13, a set of criterion data 25 on display mode switching conditions to be read from the ROM 52, an action data corresponding to the operation representative voltage signal from the ignition switch 3, and a G data corresponding to the acceleration signal from the acceleration sensor 9.

The action counter 27 counts the number of turn-on actions to the ignition switch 3 recognized in the control program 56. Each turn-on action is recognized in the program 56, as a flag status representative of a voltage transition from below 6 V to above 6 V in the ignition switch signal.

The time counter 7 counts a waiting time T for every turn-on action to the ignition switch 3.

The set of criterion data 25 is stored in the ROM 52, and contains information on a number of times (5 times in the embodiment) to be employed as a first judgment criterion with respect to the number of turn-on actions to the ignition switch 3 and information on an acceleration value (0.1 G in the embodiment) to be employed as a second judgment criterion with respect to the G data based on the signal from the acceleration sensor 9 and held in the register 31. A display mode switching flag or trigger is set in the select command if a number of turn-on actions meeting the first criterion are recognized within a predetermined value of waiting time T and followed by a G data meeting the second criterion within another predetermined value of waiting time T.

One type of acceleration sensor 9 that can be used in the invention is a beam structure cut out of a silicon substrate using a semiconductor etching process and supported at four points. A piezo-resistive effect is imparted to the surface of the beam, whereby there is a change in resistance responsive to flexing due to acceleration, this resistance change being converted to a voltage representative of acceleration by means of a bridge circuit. The acceleration sensor 9 detects an acceleration of the vehicle V caused such as by startup and deceleration, and outputs a signal proportional to the acceleration. The acceleration sensor 9 can detect forward acceleration caused by pressing down on the accelerator pedal and reverse-direction acceleration caused by pressing down on the brake pedal 47. An acceleration value detected by the acceleration sensor 9 is processed in the collision determiner 11, which uses this signal as a trigger to deploy the air bag 12 so as to protect a rider when the acceleration value exceeds a prescribed value.

The display mode selector 15 in the control program 56 responds to a resultant signal from the switching intent determiner 5, by a switching to select either the normal mode or the maintenance mode. Failure information is sent to and displayed on the failure display device 17 located on the instrument panel IP, in accordance with a selected display mode.

The failure display device 17 provides an indication such as flashing a lamp to indicate a diagnostic result of the air bag failure diagnosis program 55, in accordance with a display command from the display mode selector 15 defining the selected display mode.

A failure determiner 19 in the diagnosis program 55 has a diagnostic function for determining whether the air bag system ABS is in a normal or abnormal state, and prepares information on a diagnostic result for display to maintenance personnel and information thereon for display to the user. The determiner 19 stores in the RAM 53 the former information as a maintenance mode data 21, and the latter information as a normal mode data 23.

The normal mode data 23 is for display to the user, and provides a simple and easy-to-understand notification to the operator of the vehicle. For example, if the air bag system ABS is in a normal condition, the normal mode data 23 could be a signal that lights a lamp one time for 7 seconds, after which the lamp is extinguished, and if the air bag system ABS has experienced a failure, the data 23 could be a signal that lights a lamp for 7 seconds, and then causes it to flash at a prescribed period.

The maintenance mode data 21 is for display to maintenance personnel, and provides a more detailed notification for use by a factory inspector or service station maintenance personnel. For example, if the air bag system ABS is in a normal condition, the maintenance mode data 21 could be a signal that lights a lamp for 7 seconds, then extinguishes it for 2 seconds, and then lights it for 3 seconds, with the 2-second off and 3-second on periods being repeated thereafter. In the case of a failure, the data 21 could be a signal that provides a relatively complex flashing code that indicates to maintenance personnel not only the location of the failure, but also the seriousness of the failure as selected from a plurality of possible displays.

After the ignition switch 3 is set to off, power is removed from associated electronics, and the action counter 27 is reset to 0 with lapse of a prescribed amount of time, for example 30 seconds. The internal auxiliary power supply 37 is implemented in the form of a large-capacitance capacitor, and enables the CPU 13 to operate for necessary seconds even after the ignition switch 3 has been set to off.

Figure 3:
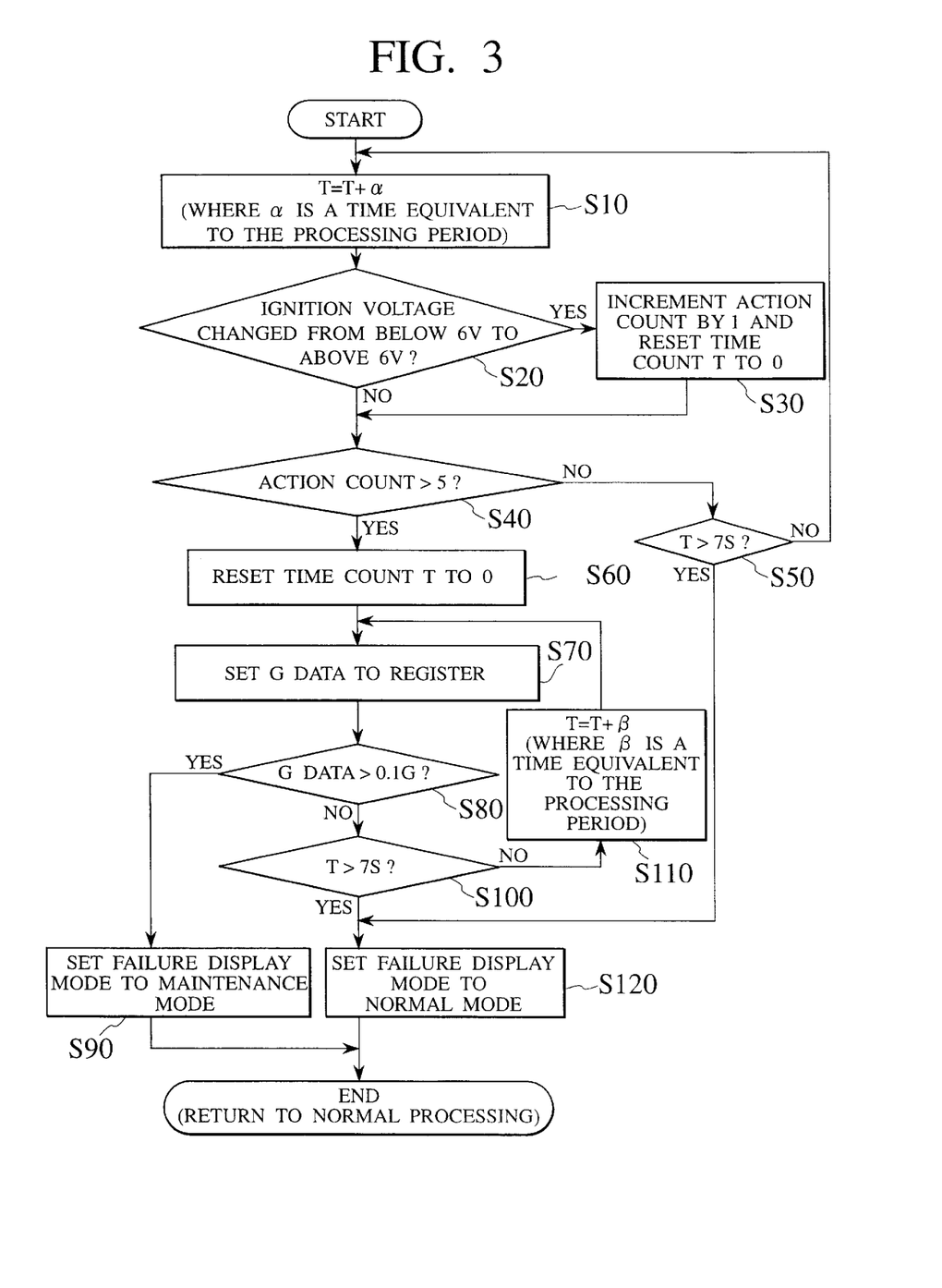
FIG. 3 is a flowchart of control actions of the display system of FIG. 2.

FIG. 3 shows a control flow of the air bag failure display system DS1.

First, an operator inserts the ignition key 33 into the key cylinder of the ignition switch 3, and repeats turn-on and turn-off actions to the ignition switch 3, while the turn-on actions are counted by the action counter 27. Concurrently, the switching intent determiner 5 monitors the counted number of turn-on actions, every prescribed period α.

At steps S10 to S50, given power from the ignition power supply 1 once and with the CPU 13 started, the number of turn-on actions (i.e. repetitions of an off-to-on operation) to the ignition switch 3 is counted over a prescribed time interval, for example 7 seconds. During the time when the ignition switch 3 is off, the CPU 13 continues to operate for several seconds, for example 7 seconds, under power from the auxiliary power supply 37. If the ignition switch 3 remains off for longer than this auxiliary power operating time, the supply of power from the auxiliary power supply 37 is stopped, and the operation of the CPU 13 also stops.

More specifically, at step S10, the time α, required for processing at steps S10, S20, S40, and S50 is added to the waiting time T to be counted by the time counter 7.

When the ignition switch 3 is turned on, the CPU 13 starts. Then, at step S20 the switching intent determiner 5 monitors the change in the ignition voltage so as to check whether the ignition switch 3 has been changed from an off condition (6 volts or lower) to an on condition (greater than 6 volts).

At this point, if the ignition switch 3 had been changed from the off condition to the on condition, the control flow proceeds to step S30, at which the count of the action counter 27 is incremented by 1 and a waiting time T counted by the time counter 7 is reset to 0. If there is no change from the off condition to the on condition, the control flow proceeds to step S40.

At the step S40, a judgment is made as to whether or not a current count at the action counter 27 has reached 5 (times). In other words, the switching intent determiner 5 performs a comparison between the first criterion (5 times) stored as a switching condition data 25 and the count of the action counter 27.

At this step S40, if the count of the counter 25 has not yet reached 5, the control flow proceeds to step S50 and, after the CPU 13 is started, another decision is made of whether or not a current waiting time T counted by the time counter 7 has exceeded a 7-second period. If the 7-second period has elapsed, the control flow proceeds to step S120, where the failure display mode is set to the normal mode, and the processing is terminated (returning to a normal processing). If, however, the 7-second period had not yet elapsed, the control flow again proceeds to step S10, from which the above processing is repeated.

If the count of the action counter 27 had exceeded 5, a subsequent step S60 is executed, at which the waiting time T counted by the time counter 7 is reset to 0 seconds, from which it starts to count time.

At steps S70, S80, S100, and S110, by inputting the acceleration signal from the acceleration sensor 9 to the CPU 13, a check is made within a prescribed time interval (for example 7 seconds) as to whether or not a foot-in action has been made to the brake pedal 37 (for deceleration). At step S70, the CPU 13 sets a current G data to the register 31. The CPU 13 may have an A/D converter, and at step S70 an A/D-converted acceleration signal may be held in the register 31.

Then, at step S80 a judgment is made as to whether the acceleration sensor 9 has experienced a deceleration that can represent the foot-in action to the brake pedal 37 which slows the vehicle down. In other words, the switching intent determiner 5 performs a comparison between the second criterion (acceleration value 0.1 G) as another switching condition data 25 and the G data held in the register GD 31.

If the G data reveals a value exceeding 0.1 G, the control flow proceeds to step S90, where the failure display mode is set to the maintenance mode. A corresponding select command from the switching intent determiner 5 causes the display mode selector 15 to read a maintenance mode data 21 from the failure determiner 19, which is sent to the failure display device 17. Thereafter, the program flow returns to the normal processing.

As a result, the maintenance mode data 21 is displayed on the failure display device 17. For example, if the air bag system ABS is in a normal condition, a lamp in the display device 17 lights for 7 seconds, is then extinguished for 2 seconds, and then lights for 3 seconds, with the 2-second off and 3-second on periods being repeated thereafter. If a failure had occurred in the air bag system ABS, however, the failure display device 17 provides a relatively complex flashing code that indicates to maintenance personnel not only the location of the failure, but also the seriousness of the failure as selected from a plurality of possible displays.

At the step S80, if a judgment was made that the G data does not exceed 0.1 G, the control flow proceeds to step S100, at which another judgment is made of a waiting time T counted by the time counter 7 to see if an associated 7-second have elapsed.

At this point, if the counted waiting time T has not reached 7 seconds, the control flow proceeds to step S110, at which a time value of p required for the processing at steps S70, S80, S100, and S110 is added to the waiting time T to be counted by the time counter 7. Then, the control flow returns to the step S70 at which a subsequent judgment is made of a current G data as to whether or not it exceeds 0.1 G, i.e. if a significant deceleration is imparted to the vehicle V, as the system waits for 7 seconds to elapse.

If the current G data does not exceed 0.1 G even after the elapse of 7 seconds, the control flow proceeds to step S120, at which the failure display mode is set to the normal mode. A select command from the switching intent determiner 5 causes the display mode selector 15 to read a normal mode data 23 from the failure determiner 19, which is sent to the failure display device 17. Thereafter, the program flow returns to the normal processing.

As a result, the normal mode data 23 is displayed on the failure display device 17. For example, if the air bag system ABS is in a normal condition, the display device 17 lights one time for 7 seconds and is then extinguished. If a failure had occurred in the air bag system ABS, the display device 17 lights one time for 7 seconds, after which it flashes at a prescribed period.

In this embodiment, the action counter 27 counts the number of repetitions of an intermittent signal input from the ignition switch 3 during a prescribed period of time, and the deceleration imparted to the vehicle is detected by the acceleration sensor 9. At the switching intent determiner 5, if the count of the action counter 27 exceeds a prescribed number of times and the acceleration exceeds a prescribed value, a judgment is made of the intent to switch the display mode. This enables the reliable achievement of the display mode intended by an operator.

The ignition switch 3 which inputs an on/off operation of the ignition key can be used to input an intermittent signal to be counted over a prescribed period of time. This enables common use of components of the air bag control system CS, thereby eliminating the need for additional components and enabling the maintenance cost to be reduced.

It is additionally or alternately possible to employ (a) seat sensor(s) 41 as (an) element(s) for interfacing a coded operator command to the control unit 50, for example in combination with or in place of the acceleration sensor 9 or the ignition switch 3.

Figure 4:
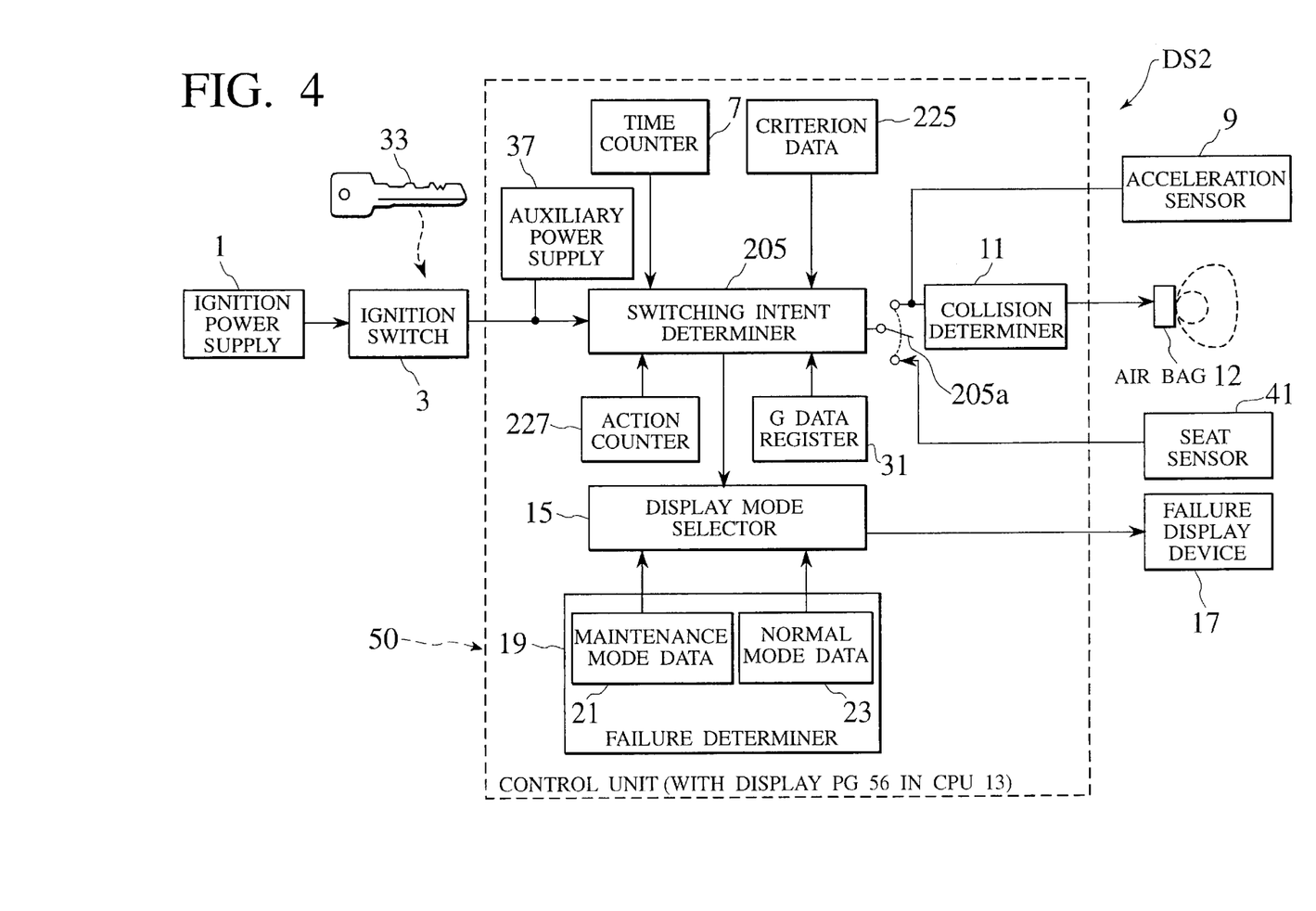
FIG. 4 is a functional block diagram of an air bag failure display system according to another embodiment of the present invention.

FIG. 4 shows an air bag failure display system DS2 according to a second embodiment of the invention, in which a seat sensor 41 is employed in combination with the acceleration sensor 9 of FIG. 2, and a switching intent determiner 205 has a software switch 205a operative for individual or sequential use of the sensing elements 41 and 9. In use of the seat sensor 41, an action counter 227 (adapted for counting ignition switch turn-on actions) counts sit-on actions of an operator to an associated seat within a prescribed period, and its count is compared by the intent determiner 205 with a third criterion data read from a memory region 225 of a ROM.

Figure 5:
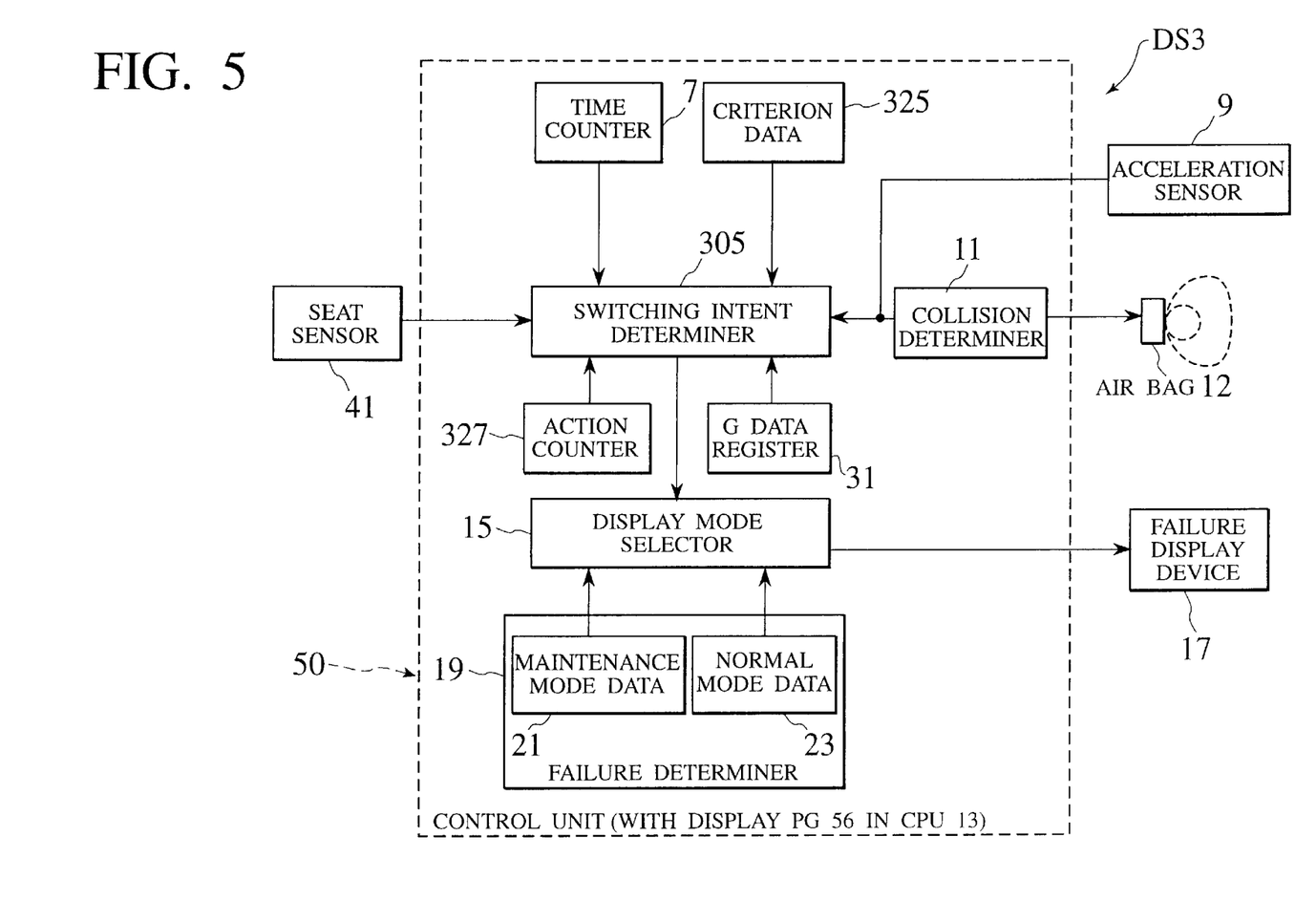
FIG. 5 is a functional block diagram of an air bag failure display system according to another embodiment of the present invention.

FIG. 5 shows an air bag failure display system DS3 according to a third embodiment of the invention, in which a seat sensor 41 is employed in place of the ignition switch 3 of FIG. 2. An action counter 327 counts sit-on actions of an operator to an associated seat within a prescribed period, and its count is compared by a switching intent determiner 305 with a corresponding first criterion data read from a memory region 325 of a ROM.

The contents of Japanese Patent Application No. 11-17596 are incorporated herein by reference.

While a preferred embodiment of the present invention has been described using specific terms, such description is for illustrative purposes, and it is to be understood that changes and variations may be made without departing from the spirit or scope of the following claims.

What is claimed is:

1. An air bag failure display system that displays a result of a failure diagnosis of an air bag system of a vehicle in a selective one of a plurality of display modes, the air bag system including an air bag controller having an apparatus employed therefor, the air bag failure display system comprising:

an operation sensor which senses a prescribed operation performed to said apparatus;

a deceleration sensor which senses a deceleration imparted to the vehicle; and a display mode selector which, after the prescribed operation has been sensed by said operation sensor, switches a current display mode to another display mode if the deceleration sensed by said deceleration sensor exceeds a prescribed value.

2. The air bag failure display system of claim 1, wherein said apparatus comprises an ignition switch to be operated by an ignition key of an engine of the vehicle.

3. The air bag failure display system of claim 1, wherein said apparatus comprises a seat sensor which senses whether a person is seated in a seat in the vehicle.

4. An air bag failure display system for a vehicle having:

a set of sensing elements arranged therein to sense a state of the vehicle; and an air bag system including:

an air bag;

an air bag control system that receives signals from the set of sensing elements and controls the air bag in response to the received signals; and an air bag failure diagnosis system that performs a failure diagnosis of the air bag system, the air bag failure display system comprising:

said set of sensing elements employed to sense variations of the state of the vehicle incurred by a combination of operator actions given to the vehicle as an operator command;

a signal processor which processes the received signals to decode the operator command; and a display device which indicates a result of the failure diagnosis in a display mode selected from a plurality of display modes different of information content in dependence on the operator command decoded by said signal processor.

5. The air bag failure display system of claim 4, wherein said set of sensing elements comprises an ignition switch to be operated by an ignition key of an engine of the vehicle and an acceleration sensor that senses a deceleration imparted to the vehicle.

6. The air bag failure display system of claim 4, wherein said set of sensing elements comprises an ignition switch to be operated by an ignition key of an engine of the vehicle and a seat sensor that senses a person seated in a seat for which the air bag is provided.

7. The air bag failure display system of claim 4, wherein said set of sensing elements comprises a seat sensor that senses a person seated in a seat for which the air bag is provided and an acceleration sensor that senses a deceleration imparted to the vehicle.

8. An air bag failure display system for a vehicle having:
sensing means arranged therein for sensing a state of the vehicle; and
an air bag system including:
an air bag;
an air bag control system for receiving signals from the sensing means to control the air bag in response to the received signals; and
an air bag failure diagnosis system for performing a failure diagnosis of the air bag system, the air bag failure display system comprising:
said sensing means employed for sensing variations of the state of the vehicle incurred by a combination of operator actions given to the vehicle as an operator command;
signal processor means for processing the received signals to decode the operator command; and
display means for indicating a result of the failure diagnosis in a display mode selected from a plurality of display modes different of information content in dependence on the operator command decoded by said signal processor means.

9. An air bag failure display method for a vehicle having:
a set of sensing elements arranged therein to sense a state of the vehicle; and
an air bag system including:
an air bag;
an air bag control system that receives signals from the set of sensing elements and controls the air bag in response to the received signals; and
an air bag failure diagnosis system that performs a failure diagnosis of the air bag system, the air bag failure display method comprising:
employing the set of sensing elements to sense variations of the state of the vehicle incurred by a combination of operator actions given to the vehicle as an operator command;
processing the received signals to decode the operator command; and
indicating a result of the failure diagnosis in a display mode selected from a plurality of display modes different of information content in dependence on the operator command decoded by said processing.

* * * * *